(No Model.)
A. BRIN.
PRESERVING MILK.
No. 361,045. Patented Apr. 12, 1887.
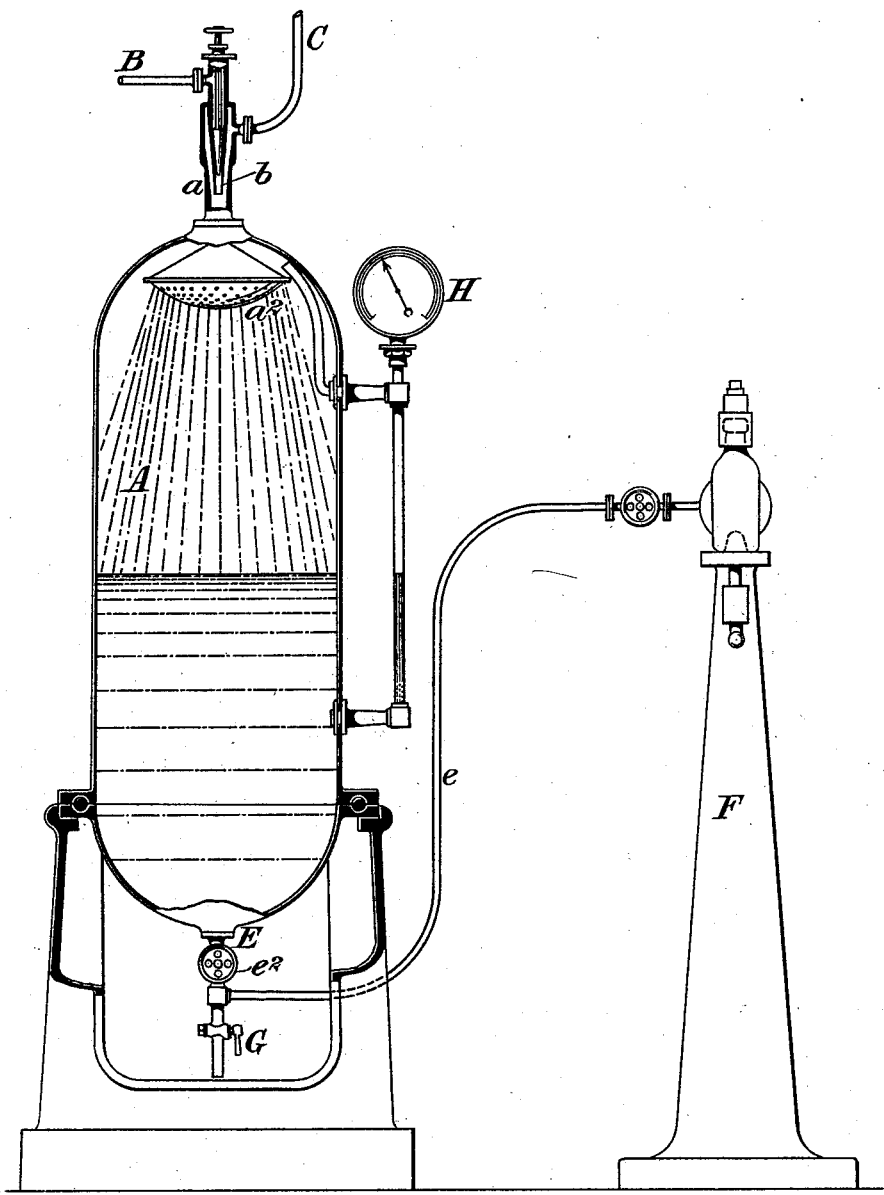

UNITED STATES PATENT OFFICE.

ARTHUR BRIN, OF PARIS, FRANCE.

PRESERVING MILK.

SPECIFICATION forming part of Letters Patent No. 361,045, dated April 12, 1887.

Application filed February 21, 1887. Serial No. 228,397. (No model.) Patented in England July 28, 1886, No. 9,738.

*To all whom it may concern:*

Be it known that I, ARTHUR BRIN, engineer and chemist, a citizen of the Republic of France, and residing at 7 Rue Gavarni, Paris, in the said Republic, have invented certain new and useful Improvements in Treating Milk for Preserving it, (for which I have applied for a patent in Great Britain on the 28th of July, 1886, No. 9,738,) of which the following is a specification.

This invention relates to preserving milk; and it consists in impregnating the milk with pure oxygen by placing the milk in a closed vessel and introducing thereinto, under pressure, the oxygen with which the milk is to be impregnated. I prefer to employ for the purpose the oxygen produced according to the process described in the specification of British Letters Patent No. 157, granted to Leon Quentin Brin and myself, as of the 5th of January, 1885.

In order that the way in which my invention may be carried into effect may be well understood, I have illustrated in the accompanying drawing an apparatus suited to the purpose.

A is a closed vessel with a pipe at $a$, with an inner nozzle, $b$. The pipe C leads from a reservoir of the milk to be treated into the pipe $a$, and the pipe B leads from a reservoir of oxygen gas under pressure into the nozzle $b$. Both these pipes are controlled by valves. The pipe $a$ terminates in a perforated rose, $a^2$. When the milk and oxygen gas are turned on, they pass together from the rose $a^2$, and the milk is thoroughly submitted to the action of the oxygen and collects in the lower part of the vessel A.

E is an outlet leading by a pipe, $e$, to the bottling-machine F, which may be of the ordinary kind used for bottling aerated waters, the said outlet being controlled by a valve, $e^2$.

G is a blow-off cock for blowing out the contents of the apparatus for cleaning or other purpose.

H is a pressure-gage for ascertaining the pressure in the vessel A.

Having now particularly described and ascertained the nature of my said invention and in what manner the same is to be performed, I declare that what I claim is—

1. The treatment of milk by impregnating it with oxygen, substantially as hereinbefore described.

2. The treatment of milk by impregnating it with oxygen, by injecting the oxygen gas under pressure into the milk while the said milk is contained in a closed vessel, substantially as hereinbefore explained with reference to the accompanying drawing.

In testimony whereof I have signed my name to this specification in the presence of two subscribing witnesses.

ARTHUR BRIN.

Witnesses:
 DOUGLAS J. NEWTON,
  9 *Birchin Lane, London.*
 CHAS. MILLS,
  47 *Lincoln's Inn Fields, London.*